United States Patent
Lagerling et al.

(10) Patent No.: US 11,816,686 B2
(45) Date of Patent: Nov. 14, 2023

(54) DETERMINING SELLABILITY SCORE AND CANCELLABILITY SCORE

(71) Applicant: Mercari, Inc., Palo Alto, CA (US)

(72) Inventors: John Alexander Lagerling, Los Altos Hills, CA (US); Kai Chun Cheung, San Francisco, CA (US); Byong Mok Oh, Los Altos, CA (US); Dhruv Mehrotra, Mountain View, CA (US); Jeffrey Kenichiro Hara, Santa Clara, CA (US)

(73) Assignee: MERCARI, INC., Palo Alto, CA (US)

( * ) Notice: Subject to any disclaimer, the term of this patent is extended or adjusted under 35 U.S.C. 154(b) by 0 days.

(21) Appl. No.: 16/288,158

(22) Filed: Feb. 28, 2019

(65) Prior Publication Data
US 2020/0104866 A1    Apr. 2, 2020

Related U.S. Application Data

(60) Provisional application No. 62/740,040, filed on Oct. 2, 2018.

(51) Int. Cl.
*G06Q 30/00* (2023.01)
*G06Q 30/0202* (2023.01)
(Continued)

(52) U.S. Cl.
CPC ......... *G06Q 30/0202* (2013.01); *G06N 20/00* (2019.01); *G06Q 30/0601* (2013.01)

(58) Field of Classification Search
CPC ........... G06Q 30/0202; G06Q 30/0601; G06Q 10/00; G06Q 10/02; G06Q 10/06; G06Q 10/10; G06Q 30/02; G06N 20/00
See application file for complete search history.

(56) References Cited

U.S. PATENT DOCUMENTS 8,065,199 B2  11/2011 Dumon et al.
8,326,658 B1 * 12/2012 Lee ................... G06Q 30/0603
                                                                705/7.11
(Continued)

FOREIGN PATENT DOCUMENTS

JP        2009-199330 A      9/2009
WO    WO-2016-074022 A1     5/2016
WO    WO-2018075995 A1 *    4/2018 ............. G06Q 10/04

OTHER PUBLICATIONS

Storbacka, Kaj, et al. "The changing role of sales: viewing sales as a strategic, cross-functional process." European Journal of marketing (2009). (Year: 2009).*

(Continued)

*Primary Examiner* — Robert D Rines
*Assistant Examiner* — Jay-Ming Wang
(74) *Attorney, Agent, or Firm* — Sterne, Kessler, Goldstein & Fox P.L.L.C.

(57) ABSTRACT

Disclosed herein are system, method, and computer program product embodiments for generating sellability and cancellability scores for selling objects on an electronic marketplace. An embodiment operates by receiving, from a mobile device, an image including an object for sale and determining information associated with the object for sale. Information associated with pre-identified objects is determined from information associated with pre-identified objects, where each of the pre-identified objects corresponds to the object for sale. A sellability score and/or a cancellability score is generated based at least in part on the information associated with the object for sale and the information associated with the pre-identified objects. The sellability score and the cancellability score are further provided to users.

16 Claims, 5 Drawing Sheets

(51) Int. Cl.
*G06N 20/00* (2019.01)
*G06Q 30/0601* (2023.01)

(56) References Cited

U.S. PATENT DOCUMENTS

| | | | | |
|---|---|---|---|---|
| 2003/0176931 A1* | 9/2003 | Pednault | .................. | G06N 7/01 |
| | | | | 700/44 |
| 2006/0178918 A1* | 8/2006 | Mikurak | .......... | G06Q 10/06315 |
| | | | | 705/7.31 |
| 2010/0228996 A1* | 9/2010 | Ginter | .................. | G06Q 50/184 |
| | | | | 726/28 |
| 2010/0250387 A1* | 9/2010 | Kassaei | .............. | G06Q 30/0601 |
| | | | | 705/26.1 |
| 2011/0106584 A1* | 5/2011 | Borthwick | ............. | G06Q 30/02 |
| | | | | 705/7.31 |
| 2011/0178828 A1 | 7/2011 | Hung et al. | | |
| 2011/0251868 A1* | 10/2011 | Mikurak | .......... | G06Q 10/06315 |
| | | | | 705/7.25 |
| 2012/0254333 A1* | 10/2012 | Chandramouli | ........ | G06F 40/10 |
| | | | | 709/206 |
| 2012/0316986 A1* | 12/2012 | Levy | .................. | G06Q 30/0601 |
| | | | | 705/26.7 |
| 2013/0081036 A1* | 3/2013 | Cohen | .................... | G06Q 10/06 |
| | | | | 718/102 |
| 2013/0238398 A1* | 9/2013 | Rothman | ........... | G06Q 30/0206 |
| | | | | 705/26.7 |
| 2014/0122469 A1* | 5/2014 | Chang | .................... | G06Q 30/06 |
| | | | | 707/725 |
| 2015/0332362 A1* | 11/2015 | Kalt | ........................ | G06Q 30/06 |
| | | | | 705/26.4 |
| 2016/0328787 A1* | 11/2016 | Szulczewski | ....... | G06Q 30/0643 |
| 2017/0330123 A1* | 11/2017 | Deshpande | ........... | G06Q 10/087 |
| 2018/0089735 A1* | 3/2018 | Lenahan | ............. | G06Q 30/0631 |
| 2018/0217991 A1* | 8/2018 | Dato | .................. | G06F 16/24578 |
| 2019/0102835 A1* | 4/2019 | Bjonerud | .............. | H04L 65/403 |
| 2020/0104868 A1 | 4/2020 | Schubert et al. | | |
| 2020/0104869 A1 | 4/2020 | Oh et al. | | |
| 2020/0104893 A1 | 4/2020 | Schubert et al. | | |
| 2020/0104897 A1 | 4/2020 | Oh et al. | | |

OTHER PUBLICATIONS

International Search Report and Written Opinion, dated Jan. 15, 2020, for PCT Appl. No. PCT/US2019/053468, 10 pages.

\* cited by examiner

DETERMINING SELLABILITY SCORE AND CANCELLABILITY SCORE

CROSS-REFERENCE TO RELATED APPLICATIONS

This application claims priority to U.S. Patent Provisional Application No. 62/740,040, filed on Oct. 2, 2018, which is herein incorporated by reference in its entirety.

This application is related to U.S. patent application Ser. No. 16/288,199 titled "Inventory Ingestion, Image Processing, and Market Descriptor Pricing System," filed Feb. 28, 2019; U.S. patent application Ser. No. 16/288,203 titled "Inventory Ingestion and Pricing System," filed Feb. 28, 2019; U.S. patent application Ser. No. 16/288,379 titled "Probabilistic Item Matching and Searching," filed Feb. 28, 2019; and U.S. patent application Ser. No. 16/288,373 titled "Probabilistic Search Biasing and Recommendations," filed Feb. 28, 2019, all of which are herein incorporated by reference in their entireties.

TECHNICAL FIELD

This disclosure is generally directed to electronic commerce and processing, and more particularly directed to automatically determining sellability and cancellability scores for selling objects on an electronic marketplace.

BACKGROUND

There are many websites and apps that allow users to buy and sell new and used products. However, when a user creates a profile or a listing for a product to be sold, the user typically does not know how likely it is that the product will actually sell. Also, creating the listing may consume substantial network bandwidth for multiple back-and-forth communications with a variety of websites, such as a marketplace, as the user performs searches for similar products and tries to determine how likely the product will sell. Similarly, when a user wants to buy a product, the user often does not know how in demand the product is. It is often cumbersome and time consuming, and may require both time and computer processing resources, for the user to try to determine how in demand the product is, whether the price of the product is reasonable, whether the seller of the product is reliable, and information on similar products for comparison purposes.

Additionally, when a product is listed on, for example, an electronic marketplace, a potential buyer typically does not know how likely it is that the listing will be cancelled by the seller before or after the potential buyer buys the product. Similarly, the seller does not know how likely it is that the buyer will cancel the sale after buying the product. Cancelling the sale by the seller can result in a poor experience for the buyer, and the reverse is also true.

Not knowing whether a product will sell and whether a listing will be cancelled may deter users from selling products they might otherwise be interested in selling, and from buying products they might otherwise be interested in purchasing. This may cost these websites and apps potential commissions and listing fees that could have been earned through the posting and sale, cost the seller revenue that could have been earned through a sale, and cost potential buyers the enjoyment of the product they would have purchased.

SUMMARY

Some embodiments disclosed herein include system, method, and computer program products for automatically generating sellability and cancellability scores for selling objects on an electronic marketplace.

Some embodiments relate to a computer-implemented method. The method includes receiving, from a mobile device, an image including an object for sale and determining information associated with the object for sale. The method further includes determining, from an electronic marketplace, information associated with pre-identified objects, where each of the pre-identified objects correspond to the object for sale. The method also includes generating a sellability score and/or a cancellability score based at least in part on the information associated with the object for sale and the information associated with the pre-identified objects. The method further includes providing the sellability score and the cancellability score to users.

Some embodiments relate to a system that includes a memory and at least one processor coupled to the memory. The processor receives, from a mobile device, an image including an object for sale and determines information associated with the object for sale. The processor further determines, from an electronic marketplace, information associated with pre-identified objects, where each of the pre-identified objects correspond to the object for sale. The processor also generates a sellability score and/or a cancellability score based at least in part on the information associated with the object for sale and the information associated with the pre-identified objects. The processor further provides the sellability score and the cancellability score to users.

Additional embodiments relate to a non-transitory computer-readable medium that stores instructions. When the instructions are executed by a processor, they cause the processor to perform operations. The operations include receiving, from a mobile device, an image including an object for sale and determining information associated with the object for sale. The operations further include determining, from an electronic marketplace, information associated with pre-identified objects, where each of the pre-identified objects correspond to the object for sale. The operations also include generating a sellability score and/or a cancellability score based at least in part on the information associated with the object for sale and the information associated with the pre-identified objects. The operations further include providing the sellability score and the cancellability score to users.

This Summary is provided merely for purposes of illustrating select embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
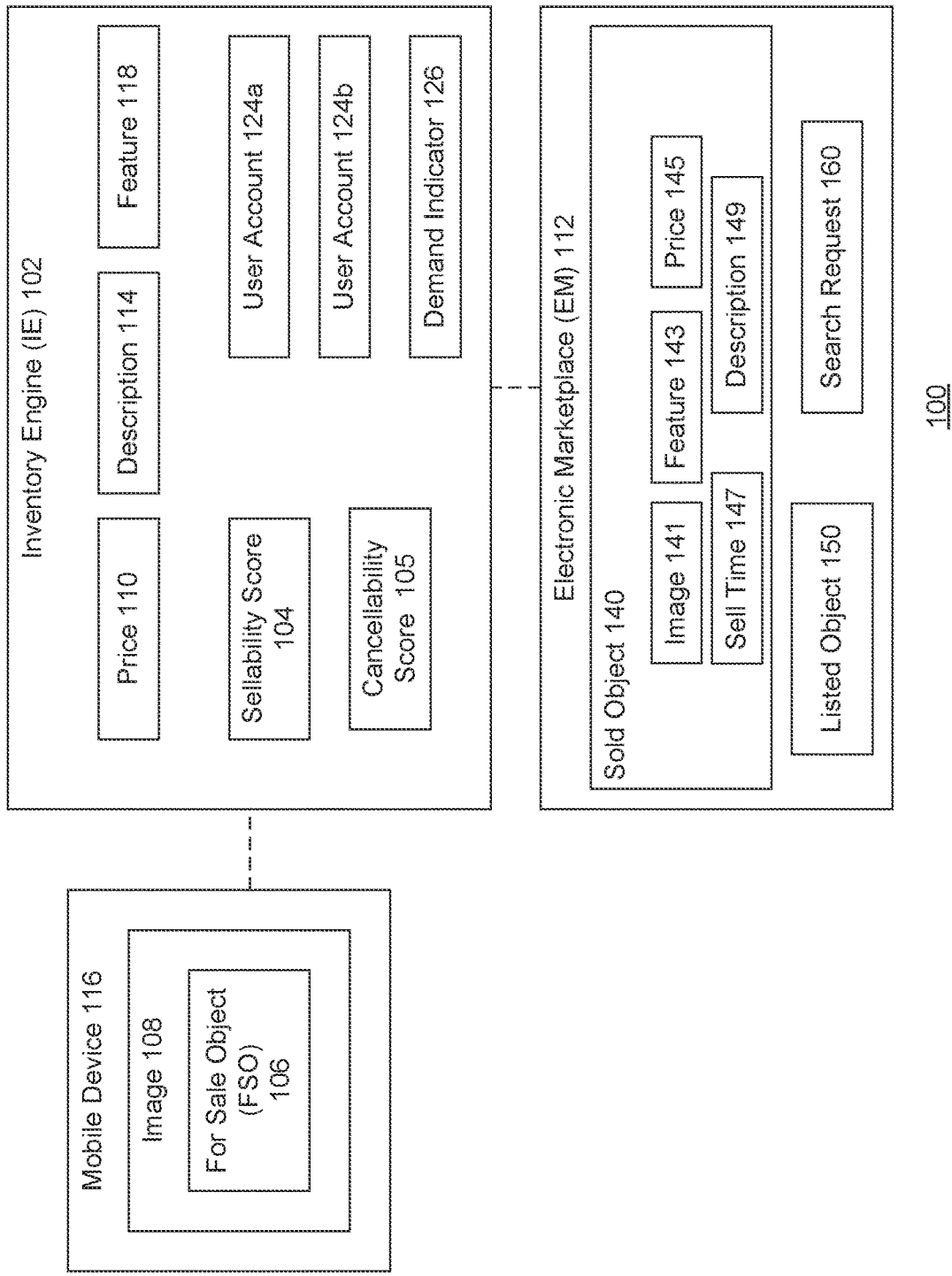
FIG. 1 is a block diagram illustrating an example system that automatically generates sellability scores and cancellability scores for objects being offered for sale, according to some embodiments.

The presented disclosure is described with reference to the accompanying drawings. In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automatically generating sellability and cancellability scores.

FIG. 1 is a block diagram illustrating an example system 100 that automatically generates sellability scores and cancellability scores for new or used items or objects being offered for sale in an electronic marketplace (EM) 112, according to some embodiments. Such items and objects are sometimes called herein "for sale objects" or FSOs 106. System 100 may simplify the process of selling and buying items for sale on the EM 112.

In an embodiment, an inventory engine (IE) 102 may receive an image 108 of a FSO 106 from a mobile device 116. For example, a user may use his mobile device 116 to take a picture or video of FSO 106. FSO 106 may be an object, item, product, or collection or set of products that a user is considering listing for sale, individually or together. Example FSOs 106 include motor vehicles, electronics, clothes, appliances, furniture, office supplies, collector's items, etc.

IE 102 may receive, retrieve, or determine additional information regarding FSO 106, information regarding the user of mobile device 116 and/or the seller of FSO 106, historical information of same or similar object(s) to FSO 106, and/or information about one or more buyers. IE 102 may use all or a subset of the received information to generate a sellability score 104 and/or a cancellability score 105 for FSO 106, according to some embodiments.

According to some embodiments, sellability score 104 is a measure of how likely FSO 106 will sell on EM 112. For example, sellability score 104 may be a number between 0 and 1, with the number indicating how likely FSO 106 will sell on EM 112 within a given period of time. In some embodiments, the value 1 represents the highest likelihood and the value 0 represents the lowest. Sellability score 104 may be time based. For example, a sellability score 104 of 0.95 may indicate that it is 95% likely that FSO 106 will sell on EM 112 within a predetermined time period from listing FSO 106 on EM 112. As a non-limiting example, the predetermined time period can be 72 hours.

One set of information that IE 102 may use in generating the sellability score 104 can include information associated with image 108, such as but not limited to the number of image(s), the quality of the image(s), etc. Image 108 may include one or more pictures or videos of FSO 106. For example, image 108 may include images taken from different angles, perspectives, or with different lighting or filters. In an embodiment, image 108 may include pictures of a model number, manufacturer name, bar code, serial number, receipt, or other object or feature or identifying information. In an embodiment, image 108 may include pictures taken of markings, including damage, on FSO 106. Image 108 may be used in a listing to offer the FSO 106 for sale in the EM 112.

In an embodiment, image 108 may include pictures or a video of one or more objects of a collection. For example, a user may have a collection of baseball cards, and may take a picture of each card, and submit all of the pictures as a collection to be sold together. Or, image 108 may include a video taken of all the cards of the set. In an embodiment, image 108 may include any visual multimedia, including augmented realty or virtual reality based pictures, screenshots, renderings, and/or video.

In an embodiment, image 108 may include multiple different FSOs 106 that a user is interested to sell individually, in various sub-combinations, or as a set. For example, image 108 may include a picture of a user's living room, including a rug, couch, two end tables, a coffee table, and lamps that may be listed for sale together as an entire living room set, and/or separately as individual pieces on EM 112. Or, for example, the two end tables may be sold together as subset of FSOs 106. In an example embodiment, image 108 may include an image of two similar or identical end tables, and a quantity in the listing may be automatically set to two.

Mobile device 116 may include a mobile phone, laptop, gaming system, tablet, desktop, smart television, wearable, appliance or other computing device that is capable of taking pictures and/or video, and transmitting image(s) 108 to IE 102. In an embodiment, mobile device 116 may include a camera that is capable of capturing image 108. In an embodiment, mobile device 116 may be executing a web-based or local app that is connected to the cloud or other network of computers through which mobile device 116 sends and receives communications with IE 102, including image 108 and price 110.

According to some examples, another set of information that IE 102 may use in generating the sellability score 104 can include a price 110 associated with FSO 106 (that is, the price that the FSO 106 is being offered for sale). For example, IE 102 may compare the price 110 to the Manufacturer's Suggested Retail Price (MSRP) of items similar to FSO 106 in determining sellability score 104. If the price 110 is lower than the MSRP of similar items, then the sellability score 104 may be higher than otherwise. Embodiments for identifying items that are the same or similar to FSO 106 are described in U.S. patent application Ser. No. 16/288,379 titled "Probabilistic Item Matching and Searching" and U.S. patent application Ser. No. 16/288,373 titled "Probabilistic Search Biasing and Recommendations" that were referenced above, and that are herein incorporated by reference in their entireties, and IE 102 may employ any of these incorporated embodiments (individually or in any combination with the teachings of this disclosure) to achieve the functions described herein.

In some embodiments, IE 102 may receive the price 110 from mobile device 116. Additionally or alternatively, IE 102 may automatically determine price 110 based on, for example, analyzing image 108, analyzing emails of the seller of FSO 106 and/or the user of mobile device 116, analyzing retailer websites, or other information. These and other embodiments for automatically determining price 110 are described in U.S. patent application Ser. No. 16/288,199 titled "Inventory Ingestion, Image Processing, and Market Descriptor Pricing System" and U.S. patent application Ser. No. 16/288,203 titled "Inventory Ingestion and Pricing System," that were referenced above, and that are herein incorporated by reference in their entireties, and IE 102 may employ any of these incorporated embodiments (individually or in any combination with the teachings of this disclosure) to achieve the functions described herein.

According to some embodiments, another set of information that IE 102 may use in generating the sellability score 104 can include description information 114 associated with FSO 106. Description information 114 can include, but is not limited to, a description of FSO 106 or a title used for listing FSO 106 in EM 112. In some embodiments, IE 102 may receive or retrieve description information 114 from mobile device 116. Additionally or alternatively, IE 102 can automatically determine description information 114 based on, for example, image 108, emails of the seller of FSO 106 and/or the user of mobile device 116, retailer websites, or other information.

Another set of information that IE 102 may use in generating the sellability score 104 can include features 118 associated with FSO 106, according to some embodiments. Features 118 may include, but are not limited to, category, brand, make, model, manufacturer, configuration, customization, color, serial number, condition indicators (e.g., poor, used, like new, new), geographic location, etc. In some embodiments, IE 102 may receive or retrieve features 118 from mobile device 116. Additionally or alternatively, IE 102 can automatically determine features 118 based on, for example, image 108, emails of the seller of FSO 106 and/or the user of mobile device 116, retailer websites, or other information.

According to some embodiments, price 110, description information 114, and features 118 may be considered as information associated with FSO 106 that IE 102 can use in generating sellability score 104. In addition to or alternatively to the information associated with FSO 106, IE 102 may use information associated with the seller of FSO 106 and/or information associated with the user of mobile device 116 in generating sellability score 104.

IE 102 may include or have access to a user account 124*a* associated with the seller of FSO 106 and/or the user of mobile device 116. User account 124*a* may include information such as: payment, bank account, name, geographic location, seller/buyer ratings, user ID, password, score information, shipping preferences, historical transaction(s) on EM 112 or other third party marketplaces, or other information about a user who is submitting FSO 106. In an embodiment, a user may see their listing and purchase history through accessing their user account 124*a* through a website or app on mobile device 116.

IE 102 may receive, retrieve, or determine information associated with the seller of FSO106 and/or information associated with the user of mobile device 116 from user account 124*a* and use the received information in determining sellability score 104. As a non-limiting example, IE 102 can use the seller's rating, the seller's geographic location, whether the seller pays for shipment of FSO 106, the seller's historical transaction(s) on EM 112 or other third party marketplaces, and other similar information in determining sellability score 104.

In addition to or alternatively to the information associated with FSO 106 and/or information associated with the seller of FSO 106, IE 102 can use information associated with a (potential) buyer of FSO 106 in determining sellability score 104. For example, IE 102 may include or have access to a user account 124*b* associated with a potential buyer of FSO 106. User account 124*b* may include information such as: payment, bank account, name, geographic location, seller/buyer ratings, user ID, password, score information, shipping preferences, historical transaction(s) on EM 112 or other third party marketplaces, or other information about a user who is submitting FSO 106.

IE 102 may receive, retrieve, or determine information associated with a potential buyer of FSO106 from user account 124*b* and use the received information in determining sellability score 104. As a non-limiting example, IE 102 can use the buyer's rating, the buyer's geographic location, the buyer's shipping preference, the buyer's historical transaction(s) on EM 112 or other third party marketplaces, and other similar information in determining sellability score 104. In one example, by using the (potential) buyer's information in determining sellability score 104, IE 102 generates a sellability score 104 that is customized (e.g., personalized) to the buyer as well as, in some embodiments, the seller.

In addition to or alternatively to the information associated with FSO 106, information associated with the seller of FSO 106, and/or information associated with a (potential) buyer of FSO 106, IE 102 can use historical information in generating sellability score 104. In some examples, the historical information can be retrieved from EM 112. Additionally or alternatively, the historical information can be retrieved from a third party marketplace.

The historical information can be determined for one or more given periods of time, according to some embodiments. For example, a first set of historical information can be determined for a first period of time and a second set of historical information can be determined for a second period of time. In this example, the second period of time can be longer than the first period of time. For example, the first period of time can include three days, one week, ten day, etc. The second period of time can include six months, one year, two years, etc.

According to some embodiments, the historical information used in generating sellability score 104 can include historical information associated with item(s) that are the same as or similar to FSO 106. For example, the similar objects may include sold objects 140 and/or listed objects 150. Sold object 140 and/or listed object 150 can include information associated with the object such as, but not limited to, image 141, features 143, price 145, sell time 147, description 149, etc. Images 141 may include user submitted images for listings. Features 143 may include user approved or otherwise determined features for objects that are or have been listed, and may include product descriptions. In an embodiment, IE 102 may use images 141 and features 143 to identify items, products or objects from EM 112 that are similar to FSO 106. IE 102 can use the historical information associated with sold object 140 and/or listed object 150 in generating sellability score 104, according to some embodiments. As noted above, embodiments for identifying items that are the same or similar to FSO 106 are described in U.S. patent application Ser. No. 16/288,379 titled "Probabilistic Item Matching and Searching" and U.S. patent application Ser. No. 16/288,373 titled "Probabilistic Search Biasing and Recommendations" that were referenced above.

EM 112 may include a website or collection of webpages or listings that enable users to list items for sale that are available for purchase. The listings may include purchase now pricing, auction based pricing, or best offer requests or purchases, to name just some examples. In an embodiment, IE 102 or EM 112 may track listing, purchase, and pricing histories for different items or objects listed and/or sold on EM 112. For example, EM 112 may track how long an item has been listed (e.g., sell time 147), the pricing history of an item between the time it is listed and sold (e.g., price 145), geographic locations of sales and purchase, and other listing, sale, and purchase information. This information may be used by IE 102 in generating sellability score 104 for FSO 106.

EM 112 may also track a pricing history (e.g., price 145) and sell time 147. Pricing history 145 may include indications of when a user increased or decreased the price of an object during the course of listing. Sell time 147 may indicate how long a listing has been active, including when a listing was deactivated or reactivated, and how this may correspond to changes in the price 145.

Additionally or alternatively, the historical information can include a demand indicator 126 generated by IE 102. Demand indicator 126 may include one or more measures of an estimated demand or supply/demand ratio for FSO 106. In an embodiment, demand indicator 126 may indicate a median or range of sell times 147 for sold objects 140 at various price points. Demand indicator 126 may indicate how long currently listed objects 150 have been listed based on their accumulating sell time 147. In an embodiment, demand indicator 126 may include a score (e.g., within a range of 1-10) that incorporates various weighted or un-weighted factors to determine a demand for FSO 106. Demand indicator 126 may include an indication of a price, purchase, or listing trend with regard to objects similar to FSO 106.

As another example, the historical information can include information on searches for object(s) that are the same as or similar to FSO 106. In an embodiment, EM 112 may track search requests 160 for different objects or categories of objects. For example, EM 112 may track how many or how often search requests 160 are received for objects that are similar to FSO 106. IE 102 may determine whether the frequency of search requests 160 is increasing, decreasing, or staying the same relative to a historical average or previous searches. In an embodiment, IE 102 may account for search request 160 information in generating demand indicator 126.

After receiving and/or retrieving the information associated with FSO 106, information associated with the seller of FSO 106 or the user of mobile device 116, information associated with a (potential) buyer of FSO 106, and/or historical information, IE 102 generates sellability score 104. It is noted that, although exemplary information are provided to be used in generating sellability score 104, the embodiments of this disclosure are not limited to these examples and other information can be also or alternatively used for generating sellability score 104 for FSO 106.

According to some embodiments, IE 102 uses a weighted combination of the information associated with FSO 106, information associated with the seller of FSO 106 or the user of mobile device 116, information associated with a (potential) buyer of FSO 106, and/or historical information to generate sellability score 104. The model and the weights (e.g., scales) used in generating sellability score 104 can be determined and updated using different mechanisms and technologies. For example, artificial intelligence and machine learning techniques and technologies such as, but not limited to, logistic regression, random forest regression models, decision tree based algorithms can be used for generating and updating the model and the weights (e.g., scales) used in generating sellability score 104. The decision tree based algorithms can include, but are not limited to, boosted tree models, gradient boosting tree models, etc. According to some embodiments, deep learning models such as deep neural network models can be used for generating and updating the model and the weights (e.g., scales) used in generating sellability score 104.

According to some embodiments, the model and the weights (e.g., scales) used in generating sellability score 104 can be determined and updated using a gradient boosting tree algorithm. For example, the gradient boosting tree algorithm can optimize a loss function. In some embodiments, the gradient boosting tree algorithm can generate the weights (e.g., scales) based on an iterative approach, and those weights can later be used to generate sellability score 104 for new items.

Additionally or alternatively, the process to generate sellability score 104 can be performed in two phases. The first phase can include preprocessing. In the preprocessing phase, the information associated with FSO 106, information associated with the seller of FSO 106 or the user of mobile device 116, information associated with a (potential) buyer of FSO 106, and/or historical information can be transformed to a specific form before it is used in the second phase. The second phase can include the iterative process (e.g., using the gradient boosting tree algorithm), for which the weights (e.g., scales) are generated. The generated weights can be applied to information associated with a new item to create a numerical output. This numerical output can further be applied to a sigmoid function to generate a value between 0-1, which can be sellability score 104.

A non-limiting example method for measuring the performance and accuracy of sellability score 104 is now discussed. In this example, for a predetermined period of time and for each FSO 106 listed on EM 112 during this period of time, IE 102 may predict whether each FSO will be sold or will not be sold (during the time limit or without any limit). IE 102 may make the prediction based on information associated with each FSO, information associated with the seller of each FSO or the user of mobile device 116, information associated with a (potential) buyer of each FSO, and/or historical information associated with object same or similar to each FSO.

IE 102 may track each of these FSOs during the predetermined time period to determine whether these FSOs were actually sold or not sold. IE 102 may determine the accuracy of (e.g., evaluate) a sellability score 104 based on the predictions and the actual sale results. For example, in some embodiments, the following parameters may be defined:

True Positive=number of FSOs that were predicted to be sold and were actually sold;

True Negative=number of FSOs that were predicted not to be sold and were not actually sold;

False Positive=number of FSOs that were predicted to be sold but were not actually sold;

False Negative=number of FSOs that were predicted not to be sold but were actually sold;

Accuracy=Number of FSOs correctly predicted/Total number of FSOs ((True Positive+True Negative)/(True Positive+True Negative+False Positive+False Negative));

$$\text{Precision=True Positive/(True Positive+False Positive)};$$

$$\text{Recall=True Positive/(True Positive+False Negative)};$$

$$\text{Evaluation Metric of Sellability Score}=2*(\text{Precision}*\text{Recall})/(\text{Precision}+\text{Recall}). \quad \text{(Equation 1)}$$

According to some examples, a moving window of the predetermined time period can be used to update the evaluation metric of sellability score 104 calculated in Equation 1. Also or alternatively, the evaluation metric of sellability scores 104 calculated in Equation 1 can be customized such that the predictions and actual sales are at least partially based on listed objects that are the same as or similar to FSO 106, such as listed objects that have the same or similar price, features, description, images, or other information as FSO 106. In some examples, the evaluation metric of sellability score 104 calculated in Equation 1 can also be customized such that the predictions and actual sales are based on listed objects by the seller of FSO 106.

It is noted that Equation 1 used to measure the accuracy of sellability score 104 is one exemplary model and the embodiments of this disclosure are not limited to this example. Other models can be used to evaluate generated sellability score 104.

According to some embodiments, cancellability score 105 is a measure of how likely the listing of FSO 106 will be cancelled by either the seller of a particular FSO 106 or the buyer of that FSO 106. IE 102 can generate one or more cancellability scores for a given FSO 106, according to some embodiments. For example, one cancellability score for FSO 106 can be customized to the seller of FSO 106. In this example, the cancellability score can indicate how likely the listing of FSO 106 will be cancelled by the seller of FSO 106. In another example, another cancellability score for FSO 106 can be customized to the buyer of FSO 106 that has recently bought FSO 106. In this example, the cancellability score can indicate how likely the listing of FSO 106 will be cancelled by the buyer of FSO 106, for example, after buying FSO 106.

Similar to determining sellability score 104 discussed above, IE 102 can use a weighted combination of the information associated with FSO 106, information associated with the seller of FSO 106 or the user of mobile device 116, information associated with a (potential) buyer of FSO 106, and/or historical information associated with same or similar object(s) to FSO 106 to generate cancellability score 105. The model used for determining cancellability score 105 may be different than the model used for determining sellability score 104, according to some embodiments. As a non-limiting example, the model used for determining cancellability score 105 can put more emphasis on the information associated with the seller of FSO 106. The information associated with the seller of FSO 106 can include the seller's historical transactions(s) on EM 112 and/or third party marketplaces. The seller's historical transaction(s) can indicate the number of times the seller has cancelled after listing an object on the EM 112, the number of times the seller has cancelled divided by the number of times the seller has listed an object, etc.

As another non-limiting example, and for the case when the cancellability score is customized to the buyer of FSO 106, the model used for determining cancellability score 105 can put more emphasis on the information associated with the buyer of FSO 106. The information associated with the buyer of FSO 106 can include the buyer's historical transactions(s) on EM 112 and/or third party marketplaces. The buyer's historical transaction(s) can indicate the number of times the buyer has cancelled after buying an object on the EM 112, the number of times the buyer has cancelled divided by the number of times the buyer has bought an object on a marketplace, the number of times the buyer has cancelled divided by the number of buyer's transactions on a marketplace as a buyer, etc.

The model and the weights (e.g., scales) used in generating cancellability score 105 can be determined and updated using different mechanisms. For example, artificial intelligence and machine learning techniques and technologies such as, but not limited to, logistic regression, random forest regression models, decision tree based algorithms can be used for generating and updating the model and the weights (e.g., scales) used in generating cancellability score 105. The decision tree based algorithms can include, but are not limited to, boosted tree models, gradient boosting tree models, etc. According to some embodiments, deep learning models such as deep neural network models can be used for generating and updating the model and the weights (e.g., scales) used in generating cancellability score 105.

In some examples, decision trees may perform better on tabular data (e.g., data in a spreadsheet). In some examples, deep learning models may perform better on dense vector representations in high-dimensional space. Vector representations are often used in natural language processing because they can capture far more complicated relational data than tabular data can. According to some embodiments, generating and updating the model and the weights (e.g., scales) used in generating cancellability score 105 can include creating vector representations both for sellers and for items, which can be the inputs to a deep learning model. The vector representations can capture the salient features about a seller and an item (e.g., historical data about the seller, historical data about similar items, etc), and from those features, the cancellability model can make a prediction.

According to some embodiments, IE 102 may track the object(s) listed by the seller of FSO 106 and/or the user of mobile device 116. For example, if IE 102 determines that the seller of FSO 106 has already listed FSO 106 in another listing, IE 102 can determine that the seller of FSO 106 may cancel another listing of FSO 106 if the first listing is sold first. Therefore, IE 102 can generate/update cancellability score 105 based on this determination (e.g., the probability that the seller of FSO 106 will cancel the listing FSO 106 should be higher.)

According to some embodiments, an inverse of cancellability score 105 of FSO 106 can be considered as a reliability score of FSO 106. In other words, a high value of cancellability score 105 indicates a low reliability score (e.g., FSO 106 and/or the seller of FSO 106 are not reliable) and a low value of cancellability score 105 indicates a high reliability score (e.g., FSO 106 and/or the seller of FSO 106 are reliable).

According to some embodiments, IE 102 generates sellability score 104 and/or cancellability score 105 for FSO 106 when the seller of FSO 106 first lists FSO 106 on EM 112. In some embodiments, after the initial determination of sellability score 104 and/or cancellability score 105, IE 102 may dynamically update sellability score 104 and/or cancellability score 105. For example, E 102 may update sellability score 104 and/or cancellability score 105 when any information associated with FSO 106, information associated with the seller of FSO 106 or the user of mobile device 116, information associated with a (potential) buyer of FSO 106, and/or historical information changes.

Dynamically updating sellability score 104 and/or cancellability score 105 can also be based on other triggers, such as update/changes to the models (e.g., the weights) used for generating sellability score 104 and/or cancellability score 105. In other words, when IE 102 updates the model used for generating sellability score 104 and/or the model used for generating cancellability score 105, IE 102 may update sellability score 104 and/or cancellability score 105 of FSOs 106 listed for sale in the EM 112. Additionally or alternatively, IE 102 may update sellability score 104 and/or cancellability score 105 based on a predetermined schedule. For example, IE 102 may update sellability score 104 and/or cancellability score 105 every 12 hours, every 24 hours, every 48 hours, etc.

As discussed above, sellability score 104 can indicate how likely FSO 106 will sell on EM 112 within a given period of time. If FSO 106 is not sold within the given period of time, IE 102 may update the model used for generating sellability scores 104. The updates to the model can further trigger the updates to the sellability scores 104.

As discussed above, cancellability score 105 is a measure of how likely the listing of FSO 106 will be cancelled by either the seller or the buyer of FSO 106. According to some examples, IE 102 may track the listing of a given FSO 106 on EM 112. If the listing of FSO 106 is not cancelled (e.g., FSO is sold on EM 112), IE 102 may update the model used for generating cancellability score 105 based on the information that IE 102 may retrieve from the sale of FSO 106.

Sellability score 104 and/or cancellability score 105 can be used in different processes. In one example, the sellability score 104 and/or cancellability score 105 associated with FSO 106 can be used in ranking search results shown to a potential buyer who is browsing the EM 112. For example, when the potential buyer searches EM 112 for an object that is the same as or similar to FSO 106, IE 102 may customized the display of the search results for the potential buyer. For example, IE 102 can use the potential buyer's historical information (e.g., previous searches, previous objects bought, previous objects sold, objected indicated as favorites, pages viewed, etc.) to rank and order the objects to be displayed to the potential buyer. The potential buyer's historical information can be based on his actions with respect to EM 112 and/or third party websites/marketplaces.

Alternatively or additionally, IE 102 can use the sellability score and/or cancellability score associated with the objects to rank the objects to be displayed to the potential buyer in the EM 112. In this way, the objects displayed to the potential buyer are not only relevant to the potential buyer's search, but are also ranked and ordered based on their sellability score. For example, objects with higher sellability scores can be displayed first. In another example, objects are ranked based on their sellability score and their cancellability score. In this example, the relevant objects with higher sellability scores and lower cancellability scores can be displayed first in the EM 112. Therefore, if an object has a high sellability score but also a high cancellability score, this object will not be ranked high, in some examples. This can enhance the experience of users on EM 112 where objects with high sellability scores and low cancellability scores are displayed at the top of the page. By using sellability score 104 and/or cancellability score 105 for ordering the display of objects for sale on the EM 112, not only are relevant objects displayed, but also objects are displayed that have high probability to be sold and/or low probability that their listings will be cancelled.

Sellability score 104 and/or cancellability score 105 can be used in other ways when displaying objects on EM 112.

In one non-limiting example, EM 112 can include different categories of objects (e.g., men, women, kids, home, sports, etc.). A user can choose one or more categories of objects for display. According to some embodiments, the objects displayed in the chosen categories can be ranked based on their sellability score. In another words, the objects having higher sellability scores can be displayed first. In another example, the objects displayed in the chosen categories can be ranked based on their sellability score and their cancellability score. In another words, the objects having higher sellability scores and lower cancellability score can be displayed first. By using sellability score 104 and/or cancellability score 105, not only are relevant objects displayed, but also objects are displayed that have high probability to be sold and/or low probability that their listings will be cancelled.

Additionally or alternatively, the display of the objects in each category can be customized to the user who is browsing EM 112. For example, IE 102 can use the user's historical information (e.g., previous searches, previous objects bought, previous objects sold, objected indicated as favorites, pages viewed, etc.) to rank the objects to be displayed. The user's historical information can be based on the user's actions with respect to EM 112 and/or third party websites/marketplaces.

In another example, sellability score 104 and/or cancellability score 105 can be used to display objects when promoting and advertising the EM 112 on third party websites. IE 102 may promoting EM 112 by displaying FSOs 106 on third party websites. The FSOs 106 displayed on third party websites can be objects relevant to the user who is browsing the third party websites. The display of the objects can be customized according to the user's historical information (e.g., previous searches, previous objects bought, previous objects sold, objects indicated as favorites, pages viewed, etc.) to rank the objects to be displayed. Additionally or alternatively, the objects displayed on third party websites can be selected and/or ranked based on their sellability score 104 and/or cancellability score 105. As a non-limiting example, IE 102 can select and display listed objects 150 from EM 112 that have higher sellability scores 104. In another example, IE 102 can select and display listed objects 150 from EM 112 that have higher sellability scores 104 and lower cancellability scores 105. Such operation may effectively promote and increase user traffic to EM 112 by not only displaying relevant objects, but also displaying objects that have a high probability to be sold and/or low probability that their listings will be cancelled.

In another embodiment, sellability score 104 and/or cancellability score 105 can be used in displaying objects to a user of EM 112 that bought an object from EM 112 or is interested in an object listed on EM 112. For example, after a user buys a listed object 150 on EM 112, IE 102 may suggest to the user additional object(s) similar to or associated with the purchased object. IE 102 may determine and rank the suggested objects based on the user's recent purchase and/or the user's historical information (e.g., previous searches, previous objects bought, previous objects sold, objected indicated as favorites, pages viewed, etc.). Additionally or alternatively, IE 102 may determine and rank the suggested objects based on the sellability of the objects. For example, IE 102 may choose the suggested objects that have higher sellability scores 104, and may display the suggested objects based on their sellability scores 104 and/or cancellability scores 105. Such operation enhances the user's experience with EM 112 by not only displaying relevant objects, but also by displaying objects that have a high probability to be sold and/or low probability that their listings will be cancelled.

IE 102 can also use sellability score 104 and/or cancellability score 105 to provide feedback to the seller of FSO 106 and/or the user of mobile device 116. After IE 102 generates and/or updates sellability score 104 of FSO 106, IE 120 may provide the sellability score 104 to the seller of FSO 106 via the mobile device 116. In one example, the seller of FSO 106 can use sellability score 104 to change information associated with FSO 106 to increase the sellability score 104. For example, the seller of FSO 106 can use sellability score 104 as a guide to change price 110, description information 114, and/or features 118. As a non-limiting example, the seller of FSO 106 can provide more images, can provide image(s) with better quality, can provide better title/description of FSO 106, can lower the price, etc. to increase sellability score 104 of FSO 106.

In some examples, IE 102 may automatically determine a price for FSO 106 and provide the determined price with sellability score 104 and/or cancellability score 105 to the seller of FSO 106 for further consideration. Embodiments for automatically determining price 110 are described in U.S. patent application Ser. No. 16/288,199 titled "Inventory Ingestion, Image Processing, and Market Descriptor Pricing System" and U.S. patent application Ser. No. 16/288,203 titled "Inventory Ingestion and Pricing System," that were referenced above, and that are herein incorporated by reference in their entireties, and IE 102 may employ any of these incorporated embodiments (individually or in any combination with the teachings of this disclosure) to achieve the functions described herein.

In some examples, IE 102 may automatically determine additional description and/or features for FSO 106. For example, IE 102 may identify objects that are the same or similar to the current FSO 106 and determine additional description and/or features for FSO 106 based on the identified objects. IE 102 may provide the determined additional description and/or features with sellability score 104 and/or cancellability score 105 to the seller of FSO 106 for further consideration. Embodiments for identifying objects that are the same or similar to the current FSO 106 are described in U.S. patent application Ser. No. 16/288,379 titled "Probabilistic Item Matching and Searching" and U.S. patent application Ser. No. 16/288,373 titled "Probabilistic Search Biasing and Recommendations" that were referenced above, and that are herein incorporated by reference in their entireties. IE 102 may employ any of these incorporated embodiments (individually or in any combination with the teachings of this disclosure) to achieve the functions described herein.

In some examples, IE 102 may automatically analyze image 108 of FSO 106. For example, IE 102 determines the quality of image 108. Based on this analysis, IE 102 may provide feedback (along with sellability score 104 and/or cancellability score 105) to the seller of FSO 106 for further consideration in increasing the quality of image 108.

IE 102 can also use cancellability score 105 for determining potential fraud within EM 112. For example, multiple high cancellability scores associated with a given user can be an indication that this user is misusing EM 112 and therefore, the user can be investigated or blocked from EM 112.

It is noted that although exemplary cases are provided for using and applying sellability score 104 and/or cancellability score 105, the embodiments of this disclosure are not limited to these examples and other processes can be implemented to use sellability score 104 and/or cancellability score 105.

Figure 2:
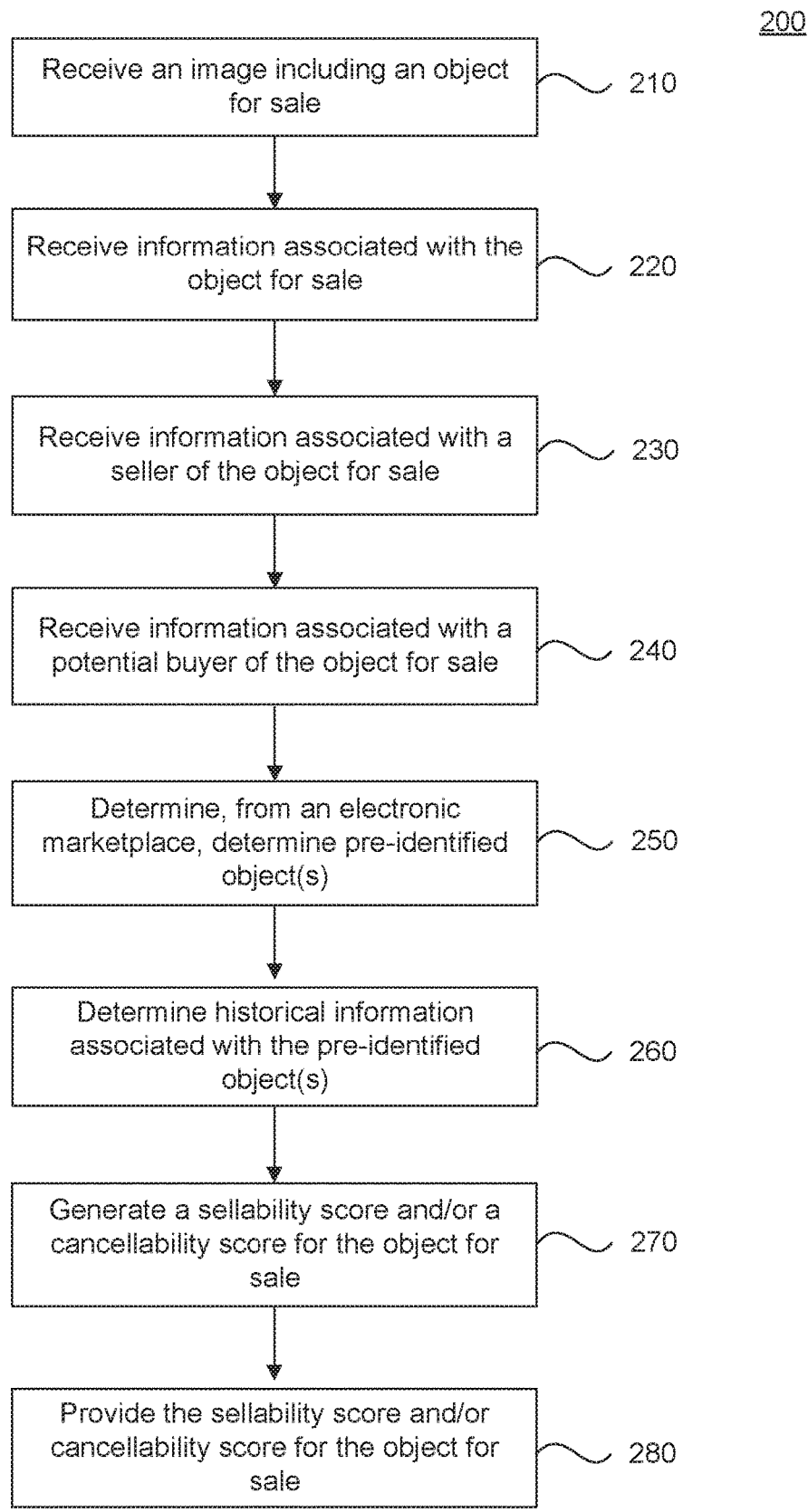
FIG. 2 is a flowchart illustrating operations of an example inventory engine that automatically generates a sellability score and/or a cancellability score for objects being offered for sale, according to some embodiments.

FIG. 2 is a flowchart illustrating operations of an example inventory engine 102 that generates sellability score and/or cancellability score for sale objects, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the example embodiments.

In 210, an image including an object for sale is received. For example, IE 102 may receive image 108 from mobile device 116. Image 108 may include multiple images of the same object 106, or different objects 106. The different objects 106 may be unrelated, or they may be from a collection or set of objects. In an embodiment, image 108 may include video or other multimedia of one or more FSOs 106. In some embodiments, the following steps are performed for each of the FSOs 106 in the image 108.

In 220, information associated with FSO 106 is received or determined. For example, IE 102 may receive information associated with FSO 106. The information associate with FSO 106 can include price 110. IE 102 may receive price 110 from mobile device 116. Additionally or alternatively, IE 102 may automatically determine price 110 based on, for example, analyzing image 108, analyzing emails of the seller of FSO 106 and/or the user of mobile device 116, analyzing retailer websites, or other information. These and other embodiments for automatically determining price 110 are described in U.S. patent application Ser. No. 16/288,199 titled "Inventory Ingestion, Image Processing, and Market Descriptor Pricing System" and U.S. patent application Ser. No. 16/288,203 titled "Inventory Ingestion and Pricing System," that were referenced above, and that are herein incorporated by reference in their entireties, and IE 102 may employ any of these incorporated embodiments (individually or in any combination with the teachings of this disclosure) to achieve the functions described herein.

Information associated with FSO 106 can also include description information 114 such as, but not limited to, a description of FSO 106 or a title used for listing FSO 106 in EM 112. Information associated with FSO 106 can also include features 118 associated with FSO 106. Features 118 may include, but are not limited to, category, brand, make, model, manufacturer, configuration, customization, color, serial number, condition indicators (e.g., poor, used, like new, new), geographic location, etc.

In 230, IE 102 can receive or determine information associated with a seller of FSO 106 and/or a user of mobile device 116. The information associated with the seller of FSO 106 and/or the user of mobile device 116 can include information such as: geographic location, seller/buyer ratings, score information, shipping preferences, historical transaction(s) on EM 112 or other third party marketplaces, or other information about a user who is submitting FSO 106.

In 240, IE 102 can receive or determine information associated with a potential buyer of FSO 106. The information associated with the potential buyer of FSO 106 can include the buyer's rating, the buyer's geographic location, the buyer's shipping preference, the buyer's historical transaction(s) on EM 112 or other third party marketplaces, and other similar information.

In 250, IE 102 can determine pre-identified object(s) on EM 112. The pre-identified objects are ones that are the same or similar to the current FSO 106. For example, EM 112 may include listings of objects that are currently listed or were previously listed for sale 150, including objects that have sold 140. EM 112 may maintain or store information such as images 141, feature 143, price 145, sell time 147, description 149 information, etc., for these current, expired, active, deactivated, and sold listings of objects 140, 150. Embodiments for identifying objects that are the same or similar to the current FSO 106 are described in U.S. patent application Ser. No. 16/288,379 titled "Probabilistic Item Matching and Searching" and U.S. patent application Ser. No. 16/288,373 titled "Probabilistic Search Biasing and Recommendations," that were referenced above, and that are herein incorporated by reference in their entireties, and IE 102 may employ any of these incorporated embodiments (individually or in any combination with the teachings of this disclosure) to achieve the functions described herein.

In 260, IE may determine historical information associated with the pre-identified object(s). The historical information can include, but is not limited to, image 141 of the pre-identified object(s), features 143 of the pre-identified object(s), price 145 of the pre-identified object(s), sell time 147 of the pre-identified object(s), description 149 the pre-identified object(s), search request(s) 160, demand indicator(s) 126, and other information.

In 270, IE 102 may use all or a subset of the received or determined information associated with FSO 106, information associated with the seller, information associated with the potential buyer, and/or the historical information associated with the pre-identified object(s) to generate a sellability score 104 and/or a cancellability score 105 for the FSO 106. As discussed above, IE 102 may use a model having weights to weigh different information to generate sellability score 104 and/or cancellability score 105.

According to some embodiments, in 270, sellability score 104 can be generated in two phases. The first phase can include preprocessing. In the preprocessing phase all or a subset of the received or determined information associated with FSO 106, information associated with the seller, information associated with the potential buyer, and/or the historical information associated with the pre-identified object(s) can be transformed to a specific form before it is used in the second phase. The second phase can include an iterative process (e.g., using the gradient boosting tree algorithm), for which the weights (e.g., scales) are generated. The generated weights can be applied to information associated with a new item to create a numerical output. This numerical output can further be applied to a sigmoid function to generate a value between 0-1, which can be sellability score 104.

According to some embodiments, in 270, generating and updating the model and the weights (e.g., scales) used in generating cancellability score 105 can include creating vector representations both for sellers and for items, which can be the inputs to a deep learning model. The vector representations can capture the salient features about a seller and an item (e.g., historical data about the seller, historical data about similar items, etc), and from those features, the cancellability model can make a prediction.

In 280, sellability score and/or cancellability score are provided. For example, IE 102 may provide sellability score 104 and/or a cancellability score 105 to mobile device 116 for display to the user of mobile device 116. Additionally or alternatively, IE 102 may provide or use sellability score 104 and/or a cancellability score 105 in other processes for ranking objects in, for example, search results, browsing results, promotion, advertising, suggesting other objects, etc., as described above.

In some embodiments, steps 210-280 may be repeated for each image of FSO 106, and therefore, sellability scores 104 and/or cancellability scores 105 can be determined for each image of FSO 106. In some embodiments, steps 220-280 may be repeated for each of the FSOs 106 contained in the image 108 obtained in step 210. In this manner, listing information and sellability/cancellability scores 104/105 may be quickly, easily, and automatically generated for items contained in the user's house, such as the living room, garage, basement, office, hobby room, backyard, etc., or any other location.

In some embodiments, steps 220-280 may be repeated if any changes are detected in the information received or determined in steps 220-260. Additionally or alternatively, steps 220-280 may be repeated if any changes are detected in the parameters of the models (e.g., the weight) used for generating sellability/cancellability. In addition or alternatively, steps 220-280 may be repeated continuously or periodically. In this manner, sellability/cancellability may be dynamically, quickly, easily, and automatically updated to reflect any changes in FSO 106 and/or in EM 112.

In some embodiments, generating sellability score 104 and/or cancellability score 105 as described above may be performed locally on a client device, e.g., personal computer (PC) or mobile device such as a smartphone or tablet computer, remotely on self-hosted service (including dedicated server(s), virtual private server (VPS), or on-premises cloud) infrastructure, remotely via third-party services, or any combination thereof. In embodiments where generating sellability score 104 and/or cancellability score 105 operations may be performed via multiple devices, certain matching operations may be performed locally, with intermediate results being delivered to remote services for confirmation, validation, other additional processing, or any combination thereof.

Figure 3:
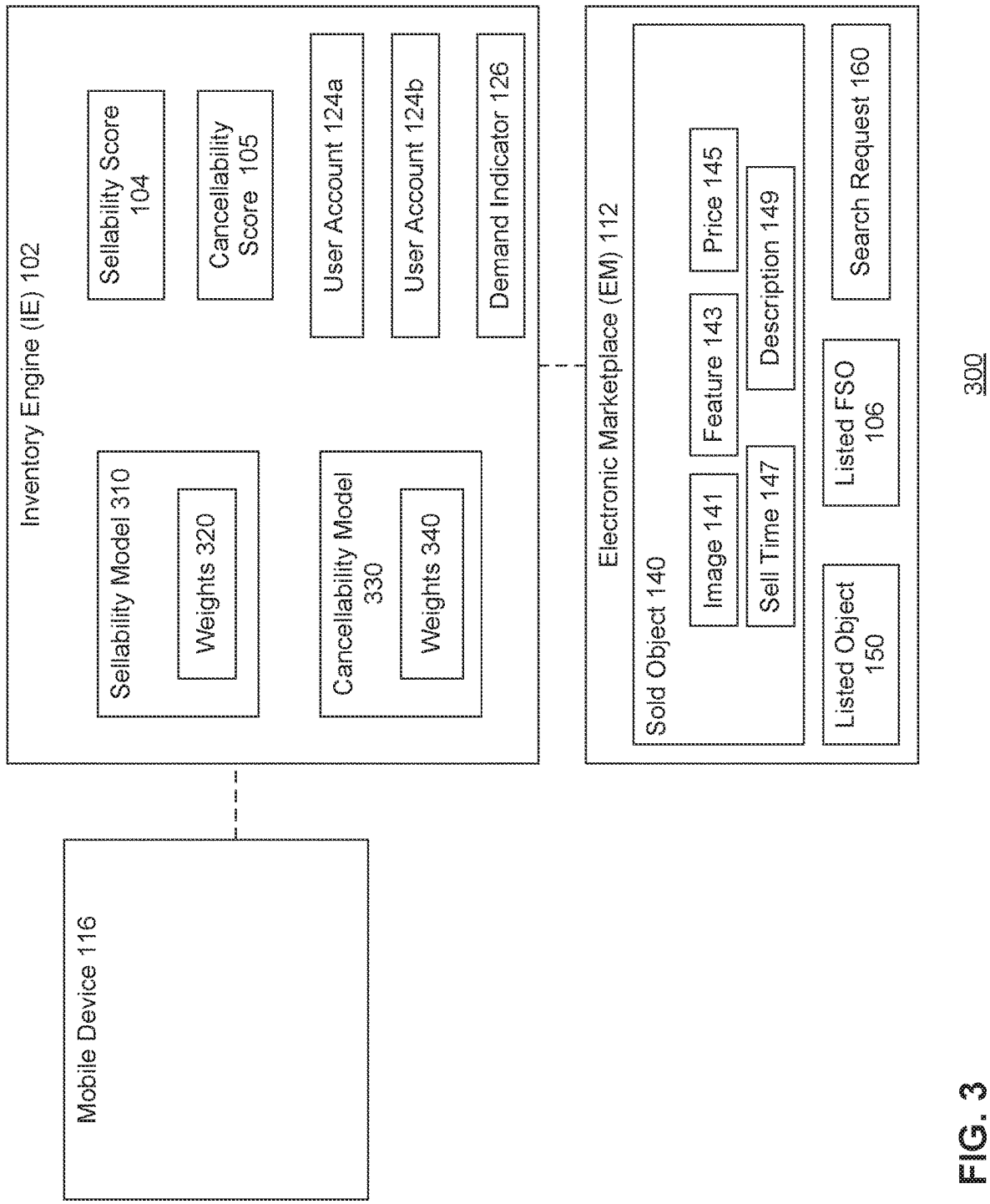
FIG. 3 is a block diagram illustrating an example system that updates (or retrains) a model used for generating a sellability score, and/or a model used for generating a cancellability score, according to some embodiments.

FIG. 3 is a block diagram illustrating an example system 300 that updates (e.g., retrains) models used for generating sellability scores and/or cancellability scores, according to some embodiments. System 300 may simplify the process of listing products for sale on EM 112, and may update sellability/cancellability scores that were calculated as described above with respect to system 100 and with reference to FIGS. 1-2.

In an embodiment, IE 102 may include sellability model 310 that is used to generate sellability scores 104 for FSOs 106, and cancellability model 330 that is used to generate cancellability scores 105 for FSOs 106. According to some embodiments, sellability model 310 may consider weights (weighing factors) 320. Sellability model 310 may weigh different received or determined information (such as, but not limited to, information associated with FSO 106, information associated with the seller, information associated with the potential buyer, and the historical information associated with the pre-identified object(s)) using weights 320 to calculate sellability scores 104.

Cancellability model 330 may consider weights (weighing factors) 340. Cancellability model 330 may weigh different received or determined information (such as, but not limited to, information associated with FSO 106, information associated with the seller, information associated with the potential buyer, and the historical information associated with the pre-identified object(s)) using weights 340 to calculate cancellability scores 105.

According to some examples, sellability model 310 and/or cancellability model 330 can include and utilize artificial intelligence and machine learning techniques and technologies such as, but not limited to, logistic regression, random forest regression models, decision tree based models/algorithms. The decision tree based algorithms can include, but are not limited to, boosted tree models, gradient boosting tree models, etc. According to some embodiments, sellability model 310 and/or cancellability model 330 can include and utilize deep learning models such as deep neural network models.

Although sellability model 310 and cancellability model 330 are illustrated as separate models, models 310 and 330 can share processes and resources, but they may use these processes and resources in different way. For example, the cancellability model 330 can put more emphasis on the information associated with the seller of FSO 106. The information associated with the seller of FSO 106 can include seller's historical transactions(s) on EM 112 and/or third party databases, marketplaces, service, website, etc. As another non-limiting example, and when cancellability score is customized to the buyer of FSO 106, cancellability model 330 can put more emphasis on the information associated with the buyer of FSO 106.

According to some embodiments, IE 102 may determine and update sellability model 310 and/or weights 320 using different mechanisms and/or algorithms. For example, artificial intelligence and machine learning techniques and technologies such as, but not limited to, logistic regression, random forest regression models, decision tree based algorithms can be used for generating and updating sellability model 310 or weights 320. The decision tree based algorithms can include, but are not limited to, boosted tree models, gradient boosting tree models, etc. According to some embodiments, deep learning models such as deep neural network models can be used for generating and updating sellability model 310 or weights 320.

Similarly, IE 102 may determine and update cancellability model 330 or weights 340 using different mechanisms, such as but not limited to, logistic regression, random forest regression models, decision tree based algorithms (e.g., boosted tree models, gradient boosted tree models, etc.). According to some embodiments, deep learning models such as deep neural network models can be used for determining and updating cancellability model 330 or weights 340.

According to some embodiments, IE 102 may dynamically update (that is, retrain) sellability model 310 (and/or weights 320) and cancellability model 330 (and/or weights 340) when any information associated with listed FSO 106, information associated with the seller of listed FSO 106 or the user of mobile device 116, information associated with a (potential) buyer of listed FSO 106, and/or historical information associated with pre-identified objects changes. As noted above, the pre-identified objects are ones that are the same or similar to a given listed FSO 106. Additionally or alternatively, IE 102 may update sellability model 310 (or weights 320) and cancellability model 330 (or weights 340) periodically. For example, IE 102 may update sellability model 310 (or weights 320) and cancellability model 330 (or weights 340) once every day, once every three days, once every week, etc. In addition or alternatively, IE 102 may update sellability model 310 (or weights 320) and cancellability model 330 (or weights 340) in real time or substantially in real time.

According to some embodiments, IE 102 may update sellability model 310 or weights 320 depending on the sale status of the listed FSO 106. For example, assume IE 102 has calculated an initial sellability score 104 using sellability model 310 for a given FSO 106 that is now listed on EM 112. After the given period of time has passed, IE 102 may determine whether listed FSO 106 was sold or not. If IE 102 determines that the listed FSO 106 was not sold within the given period of time, IE 102 may update (e.g., retrain) sellability model 310.

In this example, IE 102 can use the previously used or any updated information associated with the listed FSO 106, information associated with the seller of listed FSO 106 or the user of mobile device 116, information associated with a (potential) buyer of listed FSO 106, and/or historical information associated with pre-identified objects to update (retrain) sellability model 310. Also, IE 102 may use the information that the listed FSO 106 was not sold within the given period of time to retrain sellability model 310.

IE 102 may update cancellability model 330 or weights 340 depending on the status of the listed FSO 106. As discussed above, cancellability score 105 is a measure of how likely the listing of FSO will be cancelled by either the seller or the buyer of FSO 106. IE 102 may track the listing FSO 106 on EM 112. If the listing of FSO 106 is not cancelled, and the FSO 106 is sold, then IE 102 may update cancelability model 330 based on information related to the sale of the FSO 106.

Additionally or alternatively, IE 102 may monitor information associated with the seller of listed FSO 106 or the user of mobile device 116. For example, IE 102 may monitor user account 124a associated with the seller of listed FSO 106. If IE 102 detects changes in the information associated with the seller of listed FSO 106, IE 102 may update sellability model 310 and cancellability model 330 based on those changes. In a non-limiting example, user account 124a may include historical transaction(s) for the seller of list FSO 106 on EM 112 or other third party marketplaces. When the historical transaction(s) changes based on, for example, the seller's activities with respect to other items, IE 102 may detect the change and/or receive an indication of the change. Then, IE may update sellability model 310 and cancelability model 330 based on the detected change.

In addition or alternatively, IE 102 may monitor information associated with a (potential) buyer of listed FSO 106. For example, IE 102 may monitor user account 124b associated with a (potential) buyer of listed FSO 106. If IE 102 detects changes in the information associated with the potential buyer, IE may update sellability model 310 based on those changes. In these embodiments, sellability model 310 (and the associated calculated sellability score 104) and cancelability model 330 (and the associated calculated cancellability score 105) are generated (or updated) as a customized (e.g., personal) model (and scores 104, 105) for this specific potential buyer. In a non-limiting example, user account 124b may include historical transaction(s) for the potential buyer of list FSO 106 on EM 112 or other third party marketplaces. When the historical transaction(s) changes based on, for example, the potential buyer's activities with respect to other items, IE 102 may detect the change and/or receive an indication of the change. Then, IE 102 may update sellability model 310 and cancelability model 330 based on the detected change.

Additionally or alternatively, IE 102 may update sellability model 310 and cancelability model 330 based on other triggers, such as change(s) in historical information associated with pre-identified objects changes. As noted above, pre-identified objects are ones that are the same or similar to the listed FSO 106. For example, the pre-identified objects can include sold objects 140 and other listed objects 150. Sold object 140 and/or listed object 150 can include information associated with the object such as, but not limited to, image 141, features 143, price 145, sell time 147, description 149, etc. IE 102 may monitor sold objects 140 and other listed objects 150, and their associated information. When detecting (or receiving an indication of) changes in the information associated with sold objects 140 and/or other listed objects 150, IE 102 may update sellability model 310 and cancelability model 330 based on the changes. As a non-limiting example, when a listed object 150 is sold, sell time 147 associated with this sold object will be updated. IE 102 can determine and use this updated value of sell time 147 in updating sellability model 310. As another non-limiting example, when a listed object 150 is cancelled, IE 102 may use historical information associated with this cancelled object (e.g., the seller of this object, the features, price, description of the object, the amount of time it was listed for, etc.) in updating cancelability model 330.

IE 102 can also monitor demand indicator 126 and/or search request 160, determine any change/update in demand indicator 126 and/or search request 160, and update sellability model 310 and cancelability model 330 based on the determined change.

Although examples are provided herein where an update or a change in some information can trigger the dynamic update of sellability model 310 and cancellability model 330, this disclosure is not limited to these examples. For example, predetermined time periods can be defined such that the sellability model 310 and cancelability model 330 can be updated at the end of the predetermined time periods. According to some examples, the value of these predetermined time periods can be the same for all FSOs 106. Alternatively, the value of these predetermined time periods can be dynamically determined based on, for example, the FSO 106, the season, the demand for the particular FSO 106, etc. The values of these predetermined time periods can be the same or different for updating sellability model 310 and cancelability model 330.

According to some examples, when sellability model 310 is updated, IE 102 may update sellability score 104 of the listed FSO 106 based on the updated sellability model 310. For example, IE 102 may use the system and methods discussed with respect to FIGS. 1-3 to update the sellability score 104. Similarly, when cancelability model 330 is updated, IE 102 may update cancelability score 105 of the listed FSO 106 based on the updated cancelability model 330. For example, IE 102 may use the system and methods discussed with respect to FIGS. 1-3 to update the cancellability score 105.

Figure 4:
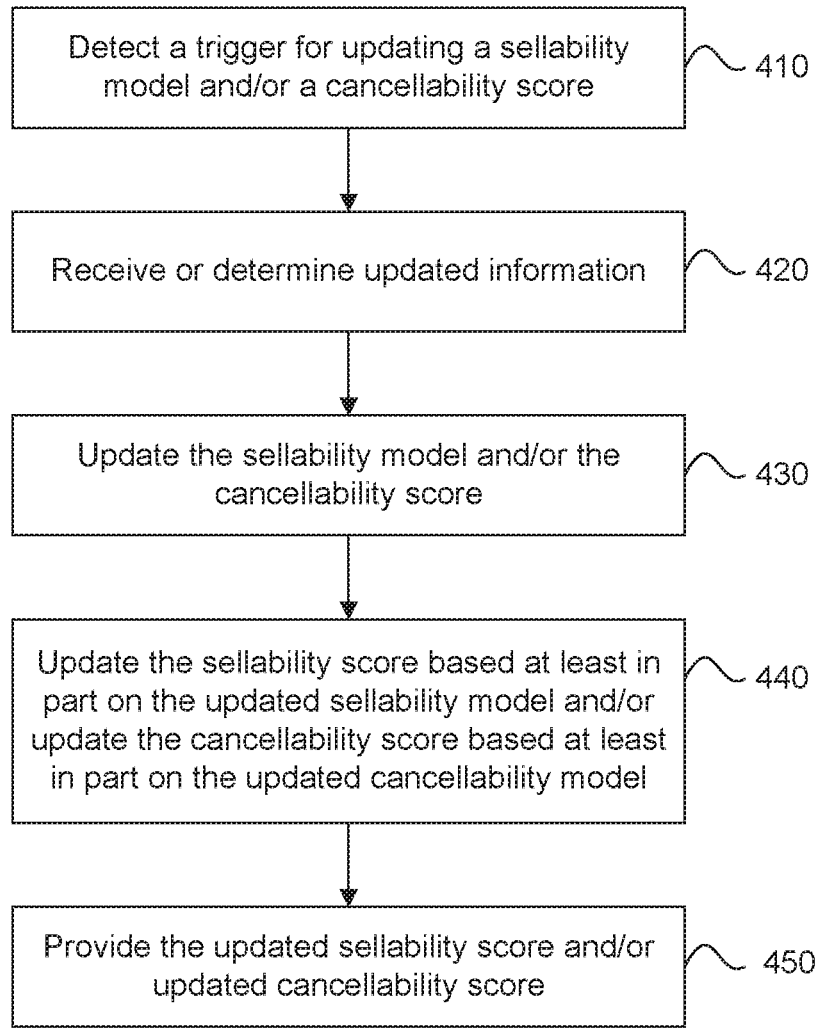
FIG. 4 is a flowchart illustrating operations of an example inventory engine that updates a model used for generating a sellability score, and/or a model used for generating a cancellability score, according to some embodiments.

FIG. 4 is a flowchart illustrating operations of an example inventory engine 102 that updates (e.g., retrains) models used for generating sellability scores and/or cancellability scores, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 3. However, method 400 is not limited to that example embodiment.

In 410, a trigger for updating a model used for generating sellability scores 104 and/or cancellability scores 105 is detected. For example, IE 102 may detect a trigger for updating sellability model 310 or updating cancellability model 330. According to some embodiments, the same trigger can be used for updating both sellability model 310 and cancellability model 330. Alternatively, different triggers can be used for updating these models 310, 330.

In one example, the trigger determined or detected by IE 102 can include the expiration of a predetermined time period. In this example, IE 102 may start a timer from when sellability model 310 or cancellability model 330 was last generated or updated. When the timer reaches the predetermined time period, IE 102 may update sellability model 310 or cancellability model 330.

In another example, the trigger for updating sellability model 310 can include a determination, by IE 102, that the listed FSO 106 was not sold within a predetermined time period. Or, the trigger for updating cancellability model 330 can include a determination, by IE 102, that the listed FSO 106 was not cancelled (e.g., it is sold) within a predetermined time period.

Additionally or alternative, the trigger for updating sellability model 310 or cancellability model 330 can include detection, by IE 102, of change(s) in information associated with listed FSO 106, change(s) information associated with the seller of listed FSO 106 or the user of mobile device 116, change(s) information associated with a (potential) buyer of listed FSO 106, and/or change(s) historical information associated with pre-identified objects.

In 420, updated information is received. For example, IE 102 may receive or detect updated information after IE 102 detects a trigger for updating sellability model 310 or cancellability model 330. The updated information can include, but is not limited to, updated information associated with listed FSO 106, updated information associated with the seller of listed FSO 106 or the user of mobile device 116, updated information associated with a (potential) buyer of listed FSO 106, and/or updated historical information associated with pre-identified objects.

In 430, the model used for generating sellability scores and/or the model used for generating cancellability scores is updated. For example, IE 102 may use the received updated information to update sellability model 310 and/or cancellability model 330.

In 440, sellability scores 104 are updated. For example, IE 102 may use the updated sellability model 310 and/or the received updated information to update sellability scores 104. Additionally or alternatively, in 440, cancellability scores 105 are updated. For example, IE 102 may use the updated cancellability model 330 and/or the received updated information to update cancellability scores 105.

In 450, the updated sellability scores and/or updated cancellability scores are provided. For example, IE 102 may provide the updated sellability scores 104 and/or the updated cancellability scores 105 to mobile device 116 for display to the user. Additionally or alternatively, IE 102 may provide or use the updated sellability scores 104 and/or the updated cancellability scores 105 to other systems and processes for ranking objects in, for example, search results, browsing results, advertising, suggesting other objects, etc., as discussed above.

In some embodiments, steps 410-450 may be repeated after each predetermined time period. Additionally or alternatively, steps 410-450 may be repeated each time trigger(s) for updating the model(s) 310, 330 is detected (as discussed above.) In this manner, listing information and sellability/ cancellability scores may be quickly, easily, automatically and more accurately generated for listed objects and/or for objects to be listed.

In some embodiments, updating sellability score 104 and/or cancellability score 105 as described above may be performed locally on a client device, e.g., personal computer (PC) or mobile device such as a smartphone or tablet computer, remotely on self-hosted service (including dedicated server(s), virtual private server (VPS), or on-premises cloud) infrastructure, remotely via third-party services, or any combination thereof. In embodiments where updating sellability score 104 and/or cancellability score 105 operations may be performed via multiple devices, certain matching operations may be performed locally, with intermediate results being delivered to remote services for confirmation, validation, other additional processing, or any combination thereof.

Figure 5:
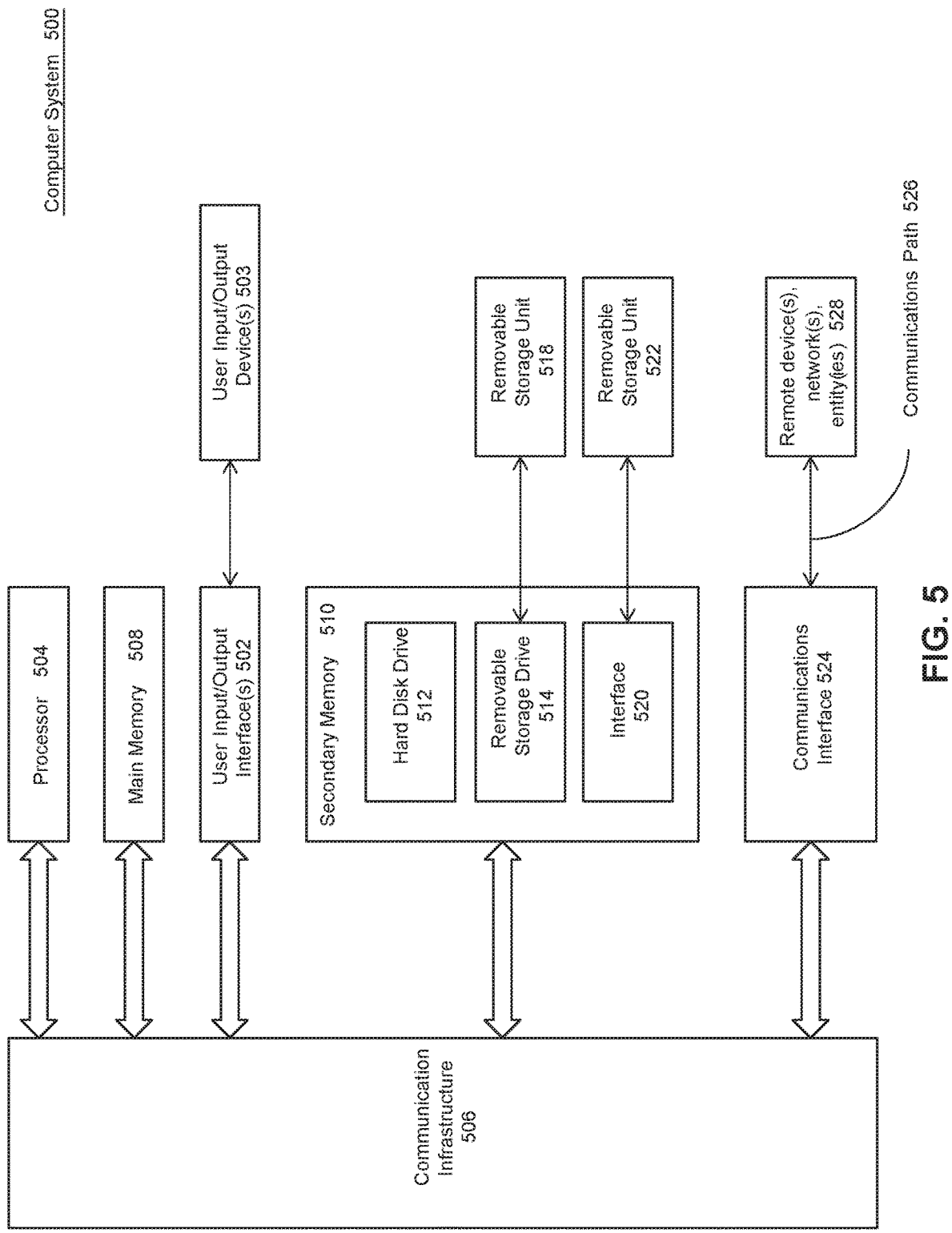
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein and shown in FIGS. 1-4, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include customer input/output device(s) 503, such as monitors, keyboards, pointing devices, etc., which may communicate with communication infrastructure 506 through customer input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions, local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving, from a mobile device, an image including an object for sale;
   determining information associated with the object for sale;
   determining, from an electronic marketplace, information associated with pre-identified objects, wherein each of the pre-identified objects corresponds to the object for sale;
   generating, by at least one processor executing a sellability model, a sellability score, wherein the execution of the sellability model comprises generating the sellability score based at least in part on the information associated with the object for sale and the information associated with the pre-identified objects, wherein the sellability score is a probability value that the object for sale will be sold within a given period of time;
   generating, by the at least one processor executing a cancellability model, a cancellability score, wherein the execution of the cancellability model comprises generating the cancellability score based at least in part on the information associated with the object for sale and the information associated with the pre-identified objects, wherein the sellability model and the cancelability model are determined and updated by the at least one processor;
   ranking a plurality of objects for sale on the electronic marketplace based on a condition;
   ranking the plurality of objects for sale based at least in part on sellability scores and cancellability scores of the plurality of objects for sale;
   ordering a display of the plurality of objects for sale on the electronic marketplace based on the ranking based on the condition and the ranking based at least in part on the sellability scores and the cancellability scores of the plurality of objects for sale;
   in response to at least one of receiving updated information associated with the object for sale or receiving updated information associated with the pre-identified objects, updating, using the at least one processor, the cancellability model used for generating the cancellability score;
   in response to at least one of determining that the object for sale was not sold within the given period of time, receiving the updated information associated with the object for sale, or receiving the updated information associated with the pre-identified objects, updating, using the at least one processor, the sellability model used for generating the sellability score; and
   generating an updated sellability score using the updated sellability model.

2. The method of claim 1, further comprising:
   determining information associated with a seller of the object for sale; and
   generating the sellability score and the cancellability score based at least in part on the information associated with the object for sale, the information associated with the pre-identified objects, and the information associated with the seller of the object for sale.

3. The method of claim 2, wherein the information associated with the seller of the object for sale comprises historical information of transactions performed by the seller on the electronic marketplace.

4. The method of claim 1, wherein the sellability model comprises a decision tree based model.

5. The method of claim 1, further comprising:
   generating an updated cancellability score using the updated cancellability model.

6. The method of claim 1, further comprising:
   determining that the object for sale is sold on the electronic market;

determining information associated with a buyer of the object for sale; and generating the cancellability score based at least in part on the information associated with the buyer of the object for sale.

7. The method of claim 1, wherein the cancellability score is a probability value that a listing of the object for sale on the electronic market will be cancelled by a seller of the object for sale or a buyer of the object for sale.

8. The method of claim 1, further comprising:
providing at least one of the sellability score or the cancellability score to the mobile device to be used to update the information associated with the object for sale.

9. The method of claim 1, further comprising:
determining that the object was not cancelled within a predetermined time period;
updating the cancellability model used for generating the cancellability score; and
generating an updated cancellability score using the updated cancellability model.

10. The method of claim 1, further comprising:
receiving the updated information associated with the object for sale, wherein the updated information are based on at least one of the sellabiliy score or the cancellability score; and
generating the sellability score and the cancellability score based at least in part on the updated information associated with the object for sale.

11. A system, comprising:
a memory; and
at least one processor coupled to the memory and configured to:
receive, from a mobile device, an image including an object for sale;
determine information associated with the object for sale;
determine, from an electronic marketplace, information associated with pre-identified objects, wherein each of the pre-identified objects corresponds to the object for sale;
generate, by executing a sellability model, a sellability score, wherein the execution of the sellability model comprises generating the sellability score based at least in part on the information associated with the object for sale and the information associated with the pre-identified objects, wherein the sellability score is a probability value that the object for sale will be sold within a given period of time;
generate, by executing a cancellability model, a cancellability score, wherein the execution of the cancellability model comprises generating the cancellability score based at least in part on the information associated with the object for sale and the information associated with the pre-identified objects, wherein the sellability model and the cancelability model are determined and updated by the at least one processor;
rank a plurality of objects for sale on the electronic marketplace based on a condition;
rank the plurality of objects for sale based at least in part on sellability scores and cancellability scores of the plurality of objects for sale;
order a display of the plurality of objects for sale on the electronic marketplace based on the ranking based on the condition and the ranking based at least in part on the sellability scores and the cancellability scores of the plurality of objects for sale;
in response to at least one of determining that the object for sale was not sold within the given period of time, receiving updated information associated with the object for sale, or receiving updated information associated with the pre-identified objects, update the sellability model used for generating the sellability score;
in response to at least one of receiving the updated information associated with the object for sale or receiving the updated information associated with the pre-identified objects, update the cancellability model used for generating the cancellability score; and
generate an updated sellability score using the updated sellability model.

12. The system of claim 11, wherein the at least one processor is further configured to:
determine information associated with a seller of the object for sale; and
generate the sellability score and the cancellability score based at least in part on the information associated with the object for sale, the information associated with the pre-identified objects, and the information associated with the seller of the object for sale.

13. The system of claim 12, wherein the information associated with the seller of the object for sale comprises historical information of transactions performed by the seller on the electronic marketplace.

14. The system of claim 11, wherein the at least one processor is further configured to:
generate an updated cancellability score using the updated cancellability model.

15. The system of claim 11, wherein the at least one processor is configured to:
provide the at least one of the sellability score or the cancellability score to the mobile device to be used to update the information associated with the object for sale.

16. A non-transitory computer-readable medium storing instructions that, when executed by a processor, cause the processor to perform operations, the operations comprising:
receiving, from a mobile device, an image including an object for sale;
determining information associated with the object for sale;
determining, from an electronic marketplace, information associated with pre-identified objects, wherein each of the pre-identified objects corresponds to the object for sale;
generating, by the processor executing a sellability model, a sellability score, wherein the execution of the sellability model comprises generating the sellability score based at least in part on the information associated with the object for sale and the information associated with the pre-identified objects, wherein the sellability score is a probability value that the object for sale will be sold within a given period of time;
generating, by the processor executing a cancellability model, a cancellability score, wherein the execution of the cancellability model comprises generating the cancellability score based at least in part on the information associated with the object for sale and the information associated with the pre-identified objects, wherein the sellability model and the cancelability model are determined and updated by the processor;

ranking a plurality of objects for sale on the electronic marketplace based on a condition;
ranking the plurality of objects for sale based at least in part on sellability scores and cancellability scores of the plurality of objects for sale;
ordering a display of the plurality of objects for sale on the electronic marketplace based on the ranking based on the condition and the ranking based at least in part on the sellability scores and the cancellability scores of the plurality of objects for sale;
in response to at least one of determining that the object for sale was not sold within the given period of time, receiving updated information associated with the object for sale, or receiving updated information associated with the pre-identified objects, updating, using the processor, the sellability model used for generating the sellability score;
in response to at least one of receiving the updated information associated with the object for sale or receiving the updated information associated with the pre-identified objects, updating, using the processor, the cancellability model used for generating the cancellability score; and
generating an updated sellability score using the updated sellability model.

* * * * *

UNITED STATES PATENT AND TRADEMARK OFFICE
CERTIFICATE OF CORRECTION

PATENT NO. : 11,816,686 B2
APPLICATION NO. : 16/288158
DATED : November 14, 2023
INVENTOR(S) : Lagerling et al.

It is certified that error appears in the above-identified patent and that said Letters Patent is hereby corrected as shown below:

In the Claims

In Column 25, Claim 10, Line 26, replace "at least one of the sellabiliy score" with --at least one of the sellability score--.

Signed and Sealed this
Second Day of January, 2024

Katherine Kelly Vidal
*Director of the United States Patent and Trademark Office*